United States Patent Office 3,365,292

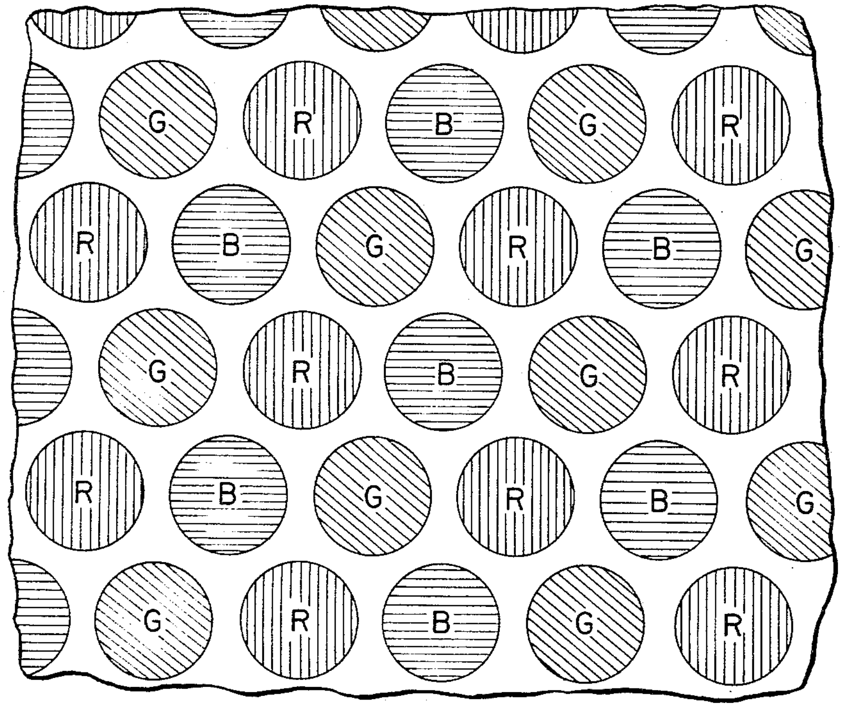
INVENTORS
Joseph P. Fiore
Sam H. Kaplan

Patented Jan. 23, 1968

3,365,292

METHOD OF ESTABLISHING A LIGHT ABSORBING DESIGN ON A SCREEN STRUCTURE OF AN IMAGE REPRODUCER

Joseph P. Fiore, Wheeling, and Sam H. Kaplan, Chicago, Ill., assignors to The Rauland Corporation, Chicago, Ill., a corporation of Illinois Continuation-in-part of application Ser. No. 220,231, Aug. 29, 1962. This application Dec. 7, 1964, Ser. No. 416,435
9 Claims. (Cl. 96—36.1)

This is a continuation-in-part of the copending application of Joseph P. Fiore et al., Ser. No. 220,231, filed Aug. 29, 1962, now abandoned, and assigned to the same assignee.

The present invention concerns, broadly speaking, a method of establishing a light absorbing design on the screen structure of an image reproducer such as a cathode-ray tube. Although the method lends itself to certain types of monochrome tubes, as will be explained, its most apparent application is to tubes which reproduce television images in simulated natural color and, for convenience, the detailed description will be directed to that environment.

It is certainly well known that the image screen of a color picture tube has a multiplicity of deposits of phosphor or fluorescent materials which represent an interleaving of at least two, but usually three, series of elemental picture areas each of which series produces light of an assigned color in response to electron bombardment. In the most familiar form, the individual phosphor deposits are referred to as dots, and clusters of three adjacent dots are collectively known as triads. Each member of the triad issues light of one of the primary colors in response to scanning electron beams. Other well recognized forms of color tubes have a generally similar interleaving of phosphor elements corresponding to the primary colors but employ a linear as distinguished from a dot configuration.

For either screen structure, it has been proposed that the elemental phosphor areas be bordered by areas which are coated with a black pigment or other material that is highly absorptive to ambient light. This construction has two particular advantages; it improves the contrast of the image and it relaxes the tolerance in laying down the elementary phosphor areas because of the protection afforded by the bordering screen sections coated in black.

A popular procedure for laying down elemental phosphor areas on such a screen makes use of a photo-resist which may carry the phosphor in suspension. When this technique is employed, the application of a particular phosphor to pre-assigned elemental areas of the screen is brought about by exposing the resist with actinic light and in accordance with the pattern desired of the particular phosphor deposit. This exposure effects a conversion by virtue of which the resist which is normally soluble in a given solvent now becomes insoluble. This facilitates removing the portions of the resist which have not been subjected to exposure. Although this is quite a satisfactory technique for depositing the light producing phosphors on the screen, its past use in applying a black pigment to chosen areas of the screen leaves a good deal to be desired. Specifically, the absorbing properties of the black pigment either prevent the actinic light from fully penetrating the layer of photo-resist as required or impose a prohibitively long exposure time.

Accordingly, it is a principal object of the invention to provide a new and improved method of establishing a light absorbing design on the screen structure of an image reproducer.

Another particular object of the invention is a new method of establishing the screen structure of a color image reproducer characterized by a light absorbing border for the elemental phosphor areas.

Another specific object of the invention is the provision of a method by means of which a border of light absorbing material may more conveniently and effectively be applied about the elemental phosphor areas of a color image reproducing screen.

The method of establishing a desired light absorbing design on a screen structure of an image reproducer which design separates elemental areas of a light-emitting design composed of fluorescent materials, in accordance with the invention, comprises applying to the screen a coating of a photo-sensitive composition having a predetermined response to a form of radiant energy, for example, actinic light. The composition contains, conveniently as a suspension, a material which has no significant absorption to the actinic light, but which becomes highly absorptive thereto in response to the application of external energy of a predetermined type, such as heat. After the coating has been applied to the screen, selected areas thereof are exposed to actinic light in a predetermined pattern related to the desired design to establish a latent image of the design in the coating. This partially exposed photosensitive coating is then developed with the solvent to remove certain portions of the coating as determined by the latent image. Thereafter the external energy, such as heat, is applied to the remainder of the coating to effect, in accordance with the preferred method, a chemical conversion of the material borne by the photosensitive composition to render it highly absorptive to light.

The features of the present invention which are believed to be novel are set forth with particularity in the appended claims. The invention, together with further objects and advantages thereof, may best be understood by reference to the single figure which is a fragmentary representation of the screen section of the so-called shadow mask color picture tube.

There are several procedures in accordance with which the present invention may be advantageously employed in laying down the screen of a shadow mask type color tube. One may first form the triad structures on the screen and then apply the light absorbing material around each triad element or, alternatively, the light absorbing material may be first deposited followed by the application of the triads.

Considering the first method, it will be understood that the screen structure of the image reproducer is a transparent panel of glass and, aside from the absorbing material that is to be laid down, has the appearance represented in the fragmentary view of the drawing. Here there is shown on the transparent screen a multiplicity of spacially separated deposits of a phosphor bearing photo-sensitive resist representing an inter-leaving of at least two series of elemental picture areas each of which series produces light of an assigned color in response to electron bombardment. More particularly, the circles that bear the letter R may be considered as deposits of red phosphor; those bearing the letter B are deposits of blue and those designated G are deposits of green. The arrangement as shown is one of triads with each triad including one red, one blue and one green element. The spacing between the dots indicates that the deposits have a spacial separation and the portions of the screen which lies between the dots defines the area or pattern to which light absorbing material is to be applied.

One convenient technique for applying the phosphor dots is the photo-resist method alluded to above in which a slurry is prepared of a photo-resist carrying a particular phosphor in suspension. A layer of the slurry is applied uniformly over the inside surface of the screen, allowed to dry, and then an exposure is made through the shadow mask of the particular tube. If the layer is exposed by actinic light from a source located in simulation of the red color center, assuming that the slurry in question bears red phosphor, only those areas of the screen intended to correspond to the red dots are subjected to light and therefore exposed. This exposure effects a conversion of the photo-sensitive material so that, while initially soluble in a given solvent such as water, the exposed portion now becomes insoluble. Consequently, developing the partially exposed coating, as by washing the screen with the solvent removes the unexposed portion of the slurry layer and leaves a series of spacially separated deposits of exposed resist bearing the red phosphor.

A repetition of the same general process, using a slurry that contains the green phosphor and locating the light source at the green color center, permits establishing spacially separated deposits of green phosphor. Of course, the use of still another slurry carrying the blue phosphor, appropriately exposed from the blue color center, completes the forming of a pattern similar to that of the figure but which, of course extends over the entirety of the screen structure. At this juncture, the deposited phosphors are still encased within localized deposits of a photo-sensitive resist. Generally, the resist is volatilizable in the sense that if the screen is subjected to an appropriate temperature, the resist decomposes and is driven off leaving only the several islands of phosphor deposited on the screen. It is preferable to defer this step, however, until the method steps leading to the establishing of the light absorbing material have been undertaken.

To that end, one first applies over the surface of the screen bearing the phosphor deposits a coating of a substance in combination with the aforesaid deposits which renders these areas substantially opaque. A yellow or red dye will suffice. A number of dyes are known that are soluble in water and it is also known that they may be fixed by the use of mordants to selectively adhere to only the deposited areas, or the dyes may be applied in a separate photo-resist similar to that used in applying the phosphors. After the dye has been applied to the separated phosphor deposits, the remainder of the screen area is washed clean, assuming, of course, that the dye has been prepared to selectively adhere to the desired areas. However, if the dye has not been so prepared, the washing step may be bypassed since the dye alone is sufficiently translucent to actinic light so as not to substantially impede the remainder of the tube processing, now to be described.

It is not necessary to make use of such a dye; the phosphor deposits may be rendered substantially non-transparent to actinic light by heating the screen to a temperature of the order of 185° centigrade. This temperature is well below the decomposition temperature of the photo-resist but nevertheless turns the material yellow-brown causing it to be non-transparent to actinic light.

After the separated deposits have been treated and rendered non-transparent to actinic light, the surface of the screen between the phosphor dots is coated with a photo-sensitive resist which, like the resists already considered, has a predetermined response to radiant energy, being in this instance normally soluble in a given solvent but becoming insoluble therein when exposed to predetermined radiant energy, such as actinic light. This resist bears a material which in carrying out the process under discussion results in establishing a dark, light absorbing deposit on those areas of the screen which may be thought of as the interstices or the separations of the elemental phosphor dots.

The specifications that such material must satisfy include an original body color which results in little or no absorption of actinic light. Ideally, the material should have the same refractive index as the photo-resist thereby providing a clear solution. If the photo-resist is water soluble, this material must be insoluble in water or whatever may be the solvent of the photo-resist. Additionally, the material must have the property of experiencing a chemical conversion in response to the application of external energy of a particular type which conversion causes the material to become highly absorptive to ambient light. It is most convenient to choose a material which undergoes such a conversion in response to the application of heat and preferably the conversion occurs at the bake-out temperature to which the tube is normally subjected, a temperature of the order of 440° centigrade. Finally, the material must be non-poisonous with respect to the phosphor.

A number of different metallic compounds have the required properties such as certain salts of iron, copper, nickel, and organic and inorganic soluble salts of manganese. Compounds of the latter have been used successfully. They are insoluble in water, have an initial white color at room temperature and become highly absorptive to light when elevated to the bake-out temperatures customarily employed in the processing of cathode-ray tubes for de-gassing and so forth. Specifically, manganous carbonate and manganous oxalate are particularly suited. Each decomposes to black manganous dioxide when heated to the bake-out temperature.

After the photo-sensitive resist bearing the manganese compound in suspension have been applied to the screen, and allowed to dry at room temperature, it is exposed by actinic light from a source disposed on the side of the screen opposite the surface or side which bears the deposits of resist. This exposure occurs at room temperature which is low compared to the conversion temperature of the manganese compound and fixes the resist rendering it insoluble. However, only the portions which cover the screen surfaces between the phosphor dots are exposed because the resist applied over the phosphor deposits is, in effect, shielded by the non-transparent property of the dye in combination with the phosphor deposits as previously described. Thus, a latent image of the desired design is formed in the newly applied resist which may be developed with the proper solvent to remove the unexposed portions of the resist as determined by the latent image. Thereafter the screen is raised to the temperature at which the chemical conversion of the manganese compound occurs. It is particularly convenient in practicing the present invention to combine this heat treating step with the bake-out process to which the tube is normally subjected because it decomposes not only the photo-resist which bears the manganese compound but also that which holds the different phosphors in suspension and deposits all of these materials onto the screen. At the same time it occasions the conversion of the manganese compound to manganese dioxide which is a black stable inorganic compound highly absorptive to light. As previously described, bake-out occurs at approximately 440° centigrade which temperature is held for about one hour to assure complete conversion of the manganese compound and decomposition or volatilization of the photo-resists suspending the phosphors and manganese compound.

An illustrative process and ingredients therefor which has provided particularly satisfactory results in practice is set forth below. Those skilled in the art will recognize that with the exception of the suspended material, i.e., the substitution of manganous carbonate for the varied phosphors, the described photo-sensitive resist is of substantially conventional composition. It is also apparent that the relative concentration of manganous carbonate within the solution is not critical, and may be varied over wide limits without materially affecting the desired results. Specifically, a typical formula for the novel "black surround" slurry and its method of application to a screen bearing pre-deposited phosphor areas of a predetermined character is as follows:

(1) Mix the following ingredients:

(a) 156 grams manganous carbonate $MnCO_3$.

(b) 103 grams aqueous solution of polyvinyl alcohol (PVA)—10% concentration by weight.
(c) 138 cc. water.

(2) Ball mill the above mixture for ten hours to yield a finely divided suspension of manganous carbonate in PVA solution.

(3) Add the following ingredients to complete the slurry:

(a) 146 cc. water.
(b) 178 grams aqueous solution of PVA—10% concentration by weight.
(c) 47 cc. ammonium dichromate solution—10% by weight.

The slurry has, in its present state, a whitish cast, and in addition, being photo-sensitive should be kept under subdued light until used.

(4) Apply tartrazine dye ($C_{16}H_9O_9N_4S_2Na_3$) solution in water to the entire surface of the phosphor bearing screen and dry.

(5) Spray or otherwise apply the milled slurry to the entire phosphor screen and allow to dry at moderate or room temperature.

(6) Expose the newly applied photo-sensitive resist with actinic light from a source, such as a mercury vapor lamp, disposed on the side of the screen opposite that which bears the deposit of resist. The period of exposure is not critical and may vary from 1–5 minutes depending, as will be understood, upon such factors as light intensity, proximity of the lamp to the screen, etc. The exposure preferably occurs at room temperature.

(7) Wash screen with pure water to remove the unexposed slurry.

(8) Complete assembly of color tube, evacuate, and bake tube at 440° C. for one hour, as in conventional color tube manufacturing process. Under the influence of this thermal energy the organic support materials for the phosphors and manganous carbonate are consumed and the latter substance decomposes to black, light absorbing manganous dioxide $MnO_2$.

The alternative procedure for preparing the tri-color screen with elemental phosphor areas surrounded by dark, light absorbing borders contemplates that the light absorbing material be deposited before the phosphor dots. This may be achieved by first coating the inside surface of the screen with a layer of the photo-resist which carries a salt of manganese as described. Thereafter the screen is placed in a lighthouse fixture and exposed three times, once with a light source positioned at locations corresponding to the red, blue and green color centers of the picture tube for which the screen is being prepared. In this case, however, the resist is of the negative type which is understood to have the property that exposure of the resist causes it to be soluble in a particular solvent whereas in the absence of such exposure the resist is insoluble. Thus, a latent image of the desired design is again formed in the resist which is developed with the appropriate solvent to remove certain areas of the coating in accordance with the latent image. In other words, after washing there will remain a pattern which circumscribes the multiplicity of screen locations in which the color phosphor deposits are to be made. These deposits may be laid down with the usual photo-resist techniques, one color at a time. In this process, the criticality of phosphor dot dimensions is eased by the presence of the previously deposited circumscribing photo-resist which bears the salt of manganese.

After all three series of phosphor dots have been applied in their photo-resist carriers, a single bake-out step decomposes all of the photo-resist carriers and results in the desired deposit of color phosphor dots bordered by the dark manganese dioxide to serve as an absorber of ambient light. This last described process is particularly attractive for the fabrication of color screens wherein the individual phosphors are deposited in strip as distinguished from dot form.

It is known to construct a monochrome tube with the phosphor deposited in the form of spatially separated dots surrounded by a light absorbing material of the type under consideration. Such a tube has markedly improved contrast even though there is a loss in brightness since not all of the screen area contributes to light output but a device of this type has application for portable television receivers that may be used out of doors.

An apertured mask similar to that of the tri-color tube is positioned between the screen and electron gun and a potential gradient is established between the mask and the screen. The beam passes through the apertures of the mask and is focused down to a smaller size, falling entirely on the discrete phosphor areas. This is the tube structure known as post deflection acceleration and the focus function causes the beam to land efficiently on the phosphor deposits. A screen for such a tube may be made in accordance with the method of this invention.

While particular embodiments have been shown and described, it will be obvious to those skilled in the art that changes and modification may be made without departing from the invention, in its broader aspects, and, therefore, the aim in the appended claims is to cover all such changes and modifications as fall within the true spirit and scope of the invention.

We claim:

1. The method of establishing a desired light-absorbing design on a screen substrate of an image reproducer in regions which separate elemental areas of a predetermined light-emitting design composed of fluorescent material, said method comprising the following steps:
   applying to said substrate a coating of a photosensitive composition having a predetermined solvency response to actinic light energy, said composition containing a material which normally exhibits low absorption to incident light, but which decomposes to a black stable inorganic material which is highly absorptive to light when raised to a predetermined temperature;
   exposing, at a temperature low compared to said predetermined temperature, selected areas of said coating to said actinic light energy;
   developing said partially exposed coating with said given solvent to remove the unexposed areas of said coating;
   and thereafter rendering said inorganic material light-absorptive in regions which separate elemental areas of the light-emitting design by raising the remainder of said coating to said predetermined temperature.

2. The method of establishing a desired light-absorbing design as defined in claim 1, in which said predetermined solvency response is one in which said photosensitive composition is normally soluble in a given solvent but becomes insoluble therein when exposed to actinic light, and in which the recited steps of said method are performed after application of said fluorescent materials to said substrate.

3. The method of establishing a desired light-absorbing design as defined in claim 1, in which said predetermined solvency response is one in which said photosensitive composition is normally insoluble in a given solvent but becomes soluble therein when exposed to actinic light, and in which the first three recited steps of said method are performed prior to application of said fluorescent material to said substrate.

4. The method of establishing a desired light-absorbing design as defined in claim 1, in which said material is a salt of manganese which is insoluble in said solvent.

5. The method of establishing a desired light-absorbing design on a screen substrate of an image reproducer in regions which separate elemental areas of a predetermined light-emitting design corresponding to interspersed elements of three different fluorescent materials, said method comprising the following steps:

applying to said substrate a coating of a photosensitive composition having a predetermined solvency response to actinic light energy, said composition containing a material which has low absorption to incident light but which becomes highly absorptive thereto in response to the application of heat energy;

exposing selected areas of said coating to said actinic light energy in a predetermined pattern related to one of said designs to establish a latent image of said light-absorbing design in said coating;

developing said partially exposed photosensitive coating with said given solvent to remove certain portions of said coating as determined by said latent image;

and thereafter rendering said material light-absorptive by applying heat energy to the remainder of said coating.

6. The method of establishing a desired light-absorbing design as defined in claim 5, in which said predetermined solvency response to light energy is one in which said photosensitive composition is normally soluble in a given solvent but becomes insoluble therein when exposed to said light energy, and in which the recited steps of said method are performed after application of said fluorescent materials to said substrate.

7. The method of establishing a desired light-absorbing design as defined in claim 5, in which said predetermined solvency response to light energy is one in which said photosensitive composition is normally insoluble in a given solvent but becomes soluble therein when exposed to said light energy, and in which the first three recited steps of said method are performed before application of said fluorescent materials to said substrate.

8. The method of establishing desired light-emitting and light-absorbing designs on a screen substrate of a color image reproducer with said light-absorbing design separating elemental areas of said light-emitting design and the latter being composed of interspersed elements of three different phosphors, said method comprising the following steps:

forming on one surface of said substrate three interleaved patterns of spacially separated deposits of respective volatilizable phosphor-bearing photosensitive compositions, the phosphor constituent of each of which compositions is adapted to produce light of a different color in response to electron bombardment;

applying a substance to said separated deposits which combines therewith to render the area covered by said deposits substantially opaque;

coating said one surface of said screen with a volatilizable photosensitive composition which is normally soluble in a given solvent but which becomes insoluble therein when exposed to actinic light, said composition containing a material which has low absorption to incident light but which becomes highly absorptive thereto in response to heating to a predetermined temperature;

exposing, at a temperature low compared to said predetermined temperature, that portion of said coating between said opaque deposits to actinic light from the direction of the opposite surface of said screen;

developing said partially exposed coating with said given solvent to remove the unexposed portion of said coating overlying said opaque deposits;

and thereafter heating said screen to said predetermined temperature to volatilize the residuum of each of said photosensitive compositions, to deposit said phosphors and said material on said screen, and to render said material highly absorptive to incident light.

9. The method of establishing desired light-emitting and light-absorbing designs on a screen substrate of a color image reproducer with said light-absorbing design separating elemental areas of said light-emitting design and the latter being composed of interspersed elements of three different phosphors, said method comprising the following steps:

coating said substrate with a volatilizable photosensitive composition which is normally insoluble in a given solvent but which becomes soluble therein when exposed to actinic light, said composition containing a material which has low absorption to incident light but which becomes highly absorptive thereto when raised to a predetermined temperature;

exposing to actinic light, at a temperature low compared to said predetermined temperature, selected areas of said coating corresponding to said elemental areas of said light-emitting design;

developing said partially exposed coating with said given solvent to remove said photosensitive resist from the exposed areas;

forming on one surface of said substrate three interleaved patterns of spatially separated deposits of respective volatilizable phosphor-bearing compositions, the phosphor constituent of each of which compositions is adapted to produce light of a different color in response to electron bombardment;

and thereafter rendering said material highly absorptive to incident light and volatilizing said photosensitive composition by elevating said screen to said predetermined temperature.

References Cited

UNITED STATES PATENTS

| | | | |
|---|---|---|---|
| 2,704,721 | 3/1955 | Land | 96—29 |
| 2,768,564 | 10/1956 | Land | 96—29 X |
| 2,827,390 | 3/1958 | Garrigus | 117—38 X |
| 2,866,705 | 12/1958 | Land et al. | 96—29 |
| 2,914,404 | 11/1959 | Fanselau et al. | 96—36.1 X |
| 3,054,672 | 9/1962 | Angelucci | 96—36.1 |
| 3,067,349 | 12/1962 | Kasperowicz et al. | |
| 3,220,836 | 11/1965 | Fairbank | 96—63 X |
| 3,226,246 | 12/1965 | Vermeulen et al. | 96—36.1 |

FOREIGN PATENTS

| | | |
|---|---|---|
| 611,086 | 12/1960 | Canada. |

NORMAN G. TORCHIN, *Primary Examiner.*

J. TRAVIS BROWN, *Examiner.*

C. L. BOWERS, *Assistant Examiner.*